United States Patent
Wu et al.

(10) Patent No.: US 8,568,831 B2
(45) Date of Patent: Oct. 29, 2013

(54) SOLVENT-BORNE COATING COMPOSITION CONTAINING ACETOACYL-FUNCTIONAL POLYMERS

(75) Inventors: Shaobing Wu, Jamestown, NC (US); T. Howard Killilea, North Oaks, MN (US); Carl L. Cavallin, Albertville, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 168 days.

(21) Appl. No.: 13/201,663

(22) PCT Filed: Feb. 17, 2010

(86) PCT No.: PCT/US2010/024388
§ 371 (c)(1), (2), (4) Date: Aug. 16, 2011

(87) PCT Pub. No.: WO2010/096424
PCT Pub. Date: Aug. 26, 2010

(65) Prior Publication Data
US 2011/0293843 A1 Dec. 1, 2011

Related U.S. Application Data

(60) Provisional application No. 61/153,128, filed on Feb. 17, 2009, provisional application No. 61/180,226, filed on May 21, 2009.

(51) Int. Cl.
*B05D 3/02* (2006.01)
(52) U.S. Cl.
USPC .......................... 427/385.5; 427/393; 427/397
(58) Field of Classification Search
None
See application file for complete search history.

(56) References Cited

U.S. PATENT DOCUMENTS

| | | | |
|---|---|---|---|
| 4,408,018 A | 10/1983 | Bartman et al. | |
| 4,772,680 A * | 9/1988 | Noomen et al. | 528/229 |
| 4,963,617 A | 10/1990 | Fourquier et al. | |
| 5,143,954 A | 9/1992 | Hutton et al. | |
| 5,362,798 A | 11/1994 | Hayes | |
| 5,424,365 A | 6/1995 | Elmore et al. | |
| 5,451,653 A | 9/1995 | Chen et al. | |
| 5,552,488 A | 9/1996 | Bradford et al. | |
| 5,567,761 A | 10/1996 | Song | |
| 5,952,443 A | 9/1999 | Wilt et al. | |
| 6,054,535 A | 4/2000 | Wilt et al. | |
| 6,203,607 B1 * | 3/2001 | Schoonderwoerd et al. | 106/287.11 |
| 6,297,320 B1 | 10/2001 | Tang et al. | |
| 6,713,551 B2 | 3/2004 | Takahashi et al. | |
| 7,319,130 B2 | 1/2008 | Swedo | |
| 2002/0076504 A1 | 6/2002 | Klinkenberg et al. | |
| 2002/0091197 A1 * | 7/2002 | Nakamura et al. | 525/123 |
| 2002/0161162 A1 * | 10/2002 | Kumar et al. | 528/93 |
| 2004/0010091 A1 * | 1/2004 | Paquet et al. | 525/386 |
| 2005/0004321 A1 * | 1/2005 | Grady | 525/330.3 |
| 2006/0122330 A1 | 6/2006 | Wu et al. | |
| 2006/0135684 A1 | 6/2006 | Killilea | |
| 2006/0135686 A1 | 6/2006 | Killilea et al. | |
| 2007/0028806 A1 * | 2/2007 | Piro et al. | 106/446 |
| 2007/0125484 A1 | 6/2007 | Dai et al. | |
| 2007/0167561 A1 | 7/2007 | Pisanova et al. | |
| 2007/0269660 A1 | 11/2007 | Killilea et al. | |
| 2007/0282046 A1 | 12/2007 | Killilea et al. | |
| 2008/0139739 A1 * | 6/2008 | Ma | 524/556 |

FOREIGN PATENT DOCUMENTS

| | | |
|---|---|---|
| EP | 0854153 A1 | 7/1998 |
| JP | 2004169024 A | 6/2004 |
| WO | 9421738 A1 | 9/1994 |
| WO | 2008145489 A1 | 12/2008 |

OTHER PUBLICATIONS

International Search Report and Written Opinion dated Jun. 24, 2010, from International Application No. PCT/US2010/024388 filed Feb. 17, 2010.
"Acetoacetoxyethyl Methacrylate (AAEM) Acetoacetyl Chemistry", Eastman, Dec. 1999, Manual Safety Data Sheets, Publication N-319C, pp. 1-12.
"JEFFAMINE T-403 Polyetheramine", Huntsman Corporation, www.huntsman.com, 2008.
"Technical Data Sheet: Setalux 17-7205", Nuplex Resins, www.nuplexresins.com, Jan. 2007.
Eastman, "Utility of acetoacetoxyethyl methacrylate (AAEM) in thermoset coatings", Nov. 1, 2003, Retrieved from the internet: URL: http://www.eastman.com/Literature_Center/N/N322.pdf, pp. 17-18.

* cited by examiner

*Primary Examiner* — Erma Cameron
(74) *Attorney, Agent, or Firm* — Brian R. Morrison; Westman, Champlin & Koehler, P.A.

(57) ABSTRACT

A coating composition comprising an acetoacyl-functional polymer, an organic solvent, and a crosslinking agent.

20 Claims, No Drawings

SOLVENT-BORNE COATING COMPOSITION CONTAINING ACETOACYL-FUNCTIONAL POLYMERS

CROSS-REFERENCE TO RELATED APPLICATION(S)

This Application is a 371 National Stage Application of International Application No. PCT/US2010/024388, filed on Feb. 17, 2010, published as International Publication No. WO 2010/096424; and which claims priority to U.S. Provisional Application No. 61/153,128, filed on Feb. 17, 2009 and to U.S. Provisional Application No. 61/180,226, filed on May 21, 2009.

FIELD

The present disclosure relates to solvent-borne coating compositions. In particular, the present disclosure relates to solvent-borne coating compositions having acetoacyl-functional polymers, and to coatings prepared from the solvent-borne coating compositions.

BACKGROUND

Coating compositions are applied to a variety of products for use in residential, commercial, and industrial applications. For example, wood products are widely used in residential and commercial applications, and are popular due to their aesthetic and structural qualities. These products, such as furniture, flooring, frames, decks, stairs, fences, and the like typically include coatings that provide protective and/or aesthetic qualities to the underlying wood materials. The use of such coatings can increase the endurance and weathering resistance of the wood products, thereby extending the useful lives of the products.

Acid-catalyzed urea or melamine-resin crosslinked coatings have been predominately used in the coatings, adhesives, and sealants industries, including wood-based applications, due to the economic advantage and application flexibility. However, these coating systems contain and may emit low concentrations of free formaldehyde, which may be undesirable in certain applications. With the increased awareness of the effects of formaldehyde from the conventional acid catalyzed coatings, the coating industries have been searching alternatives to the urea or melamine crosslinkers. Thus, there is an ongoing need for alternative compositions for use in coating applications.

SUMMARY

In one embodiment, the present invention provides a coating composition that includes a polymer having an organic backbone and at least one acetoacyl-functional group, at least one carbonyl-functional solvent compound, and a crosslinking agent. Preferably, the at least one carbonyl-functional solvent compound has a sufficient concentration in the coating composition to provide a pot life that is greater than a pot life attainable with an equal concentration of xylene.

In another embodiment, the present invention provides a method of coating a substrate. The method includes providing a coating composition that includes a polymer having an organic backbone and at least one acetoacyl-functional group, at least one crosslinking agent, and at least one carbonyl-functional solvent compound, where a concentration of solvent-based carbonyl groups from the at least one carbonyl-functional solvent compound constitutes greater than about 15% by weight of the formed coating composition. The method further includes applying the coating composition to a substrate, removing at least a portion of the at least one carbonyl-functional solvent compound, and at least partially crosslinking the polymer with the use of the at least one crosslinking agent.

In yet another embodiment, the present invention provides a method for forming a coating on a wood substrate. The method includes providing a solvent-borne coating composition that includes at least one crosslinking agent, an organic solvent, and a polymer having an organic backbone and a plurality of acetoacyl-functional groups. The method further includes applying the solvent-borne coating composition to the wood substrate, removing at least a portion of the organic solvent, and at least partially crosslinking the polymer with the use of the at least one crosslinking agent.

DETAILED DESCRIPTION

The present disclosure is directed to a solvent-borne coating composition that may be used to form protective and aesthetic coatings on a variety of substrates, such as wood substrates, desirably without the emissions of formaldehyde or other toxic compounds. The coating composition preferably includes at least one acetoacyl-functional polymer, an organic solvent, and at least one crosslinking agent. In some embodiments, the organic solvent preferably includes at least one carbonyl-functional solvent (CFS) compound. As discussed below, the use of the CFS compound(s) with the acetoacyl-functional polymer(s) desirably extends the pot life of the coating composition.

In additional embodiments, as discussed below, coatings formed from the coating composition are suitable for use on wood substrates and desirably provide resistance to chemicals, moisture, and ultraviolet (UV)-light exposure. These properties allow the coatings to protect the underlying wood substrates from weathering conditions, while also providing aesthetic qualities (e.g., tints and colors), if desired.

The acetoacyl-functional polymer(s) of the coating composition preferably include a plurality of crosslinkable groups, where the crosslinkable groups may include at least one acetoacyl-functional group, and more preferably a plurality of acetoacyl-functional groups. The acetoacyl-functional group(s) are crosslinkable groups having the following formula:

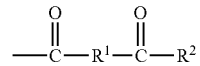

where $R^1$ may be a substituted or unsubstituted hydrocarbon chain ranging from $C_1$ to $C_{22}$, more preferably an unsubstituted hydrocarbon chain ranging from $C_1$ to $C_5$, and even more preferably a methylene [—$CH_2$—] group. $R^2$ may be a substituted or unsubstituted alkyl group ranging from $C_1$ to $C_{22}$, more preferably an unsubstituted alkyl group ranging from $C_1$ to $C_5$, and even more preferably a methyl group. In embodiments in which $R^2$ is a methyl group, the acetoacyl-functional group may be referred to as an acetoacetyl-functional group. $R^1$ and $R^2$ may each also include one or more heteroatoms, such as oxygen, nitrogen, and combinations thereof.

The following discussion refers to acetoacyl-functional polymer in the singular form with the understanding that the coating composition of the present disclosure may include a plurality of acetoacyl-functional polymers, where each of the plurality of polymers includes at least one acetoacyl-functional group. The acetoacyl-functional group(s) preferably account for greater than about 50% by weight of the crosslinkable groups of the acetoacyl-functional polymer, more preferably greater than about 75% by weight, and even more preferably greater than about 85% by weight, based on an entire weight of the crosslinkable groups of the acetoacyl-functional polymer. In one embodiment, the crosslinkable groups of the acetoacyl-functional polymer consist essentially of acetoacyl-functional groups.

The acetoacyl-functional polymer may be prepared through a polymerization reaction, such as a free-radical solution polymerization. The acetoacyl functionality may be incorporated into the polymer from a variety of monomers containing acetoacyl-functional groups. Examples of suitable monomers include acetoacetoxyethyl(meth)acrylates, acetoacetoxypropyl(meth)acrylates, allyl acetoacetates, acetoacetoxybutyl(meth)acrylates, 2,3-di(acetoacetoxy)propyl(meth)acrylates, t-butyl acetoacetate, diketene, derivatives thereof, and combinations thereof. The term "(meth) acrylate", as used herein, refers to an acrylate and a methacrylate functionality. An example of a particularly suitable monomer for imparting acetoacyl functionality includes acetoacetoxyethyl methacrylate. Preferred concentrations of the monomers containing acetoacyl-functional groups in the acetoacyl-functional polymer range from about 1% by weight to about 50% by weight, more preferably from about 5% by weight to about 30% by weight, and even more preferably from about 10% by weight to about 25% by weight, based on an entire weight of the acetoacyl-functional polymer.

The acetoacyl-functional polymer may also incorporate chain-extending (e.g., copolymerizing) monomers, such as ethylenically-unsaturated monomers. Examples of suitable ethylenically-unsaturated monomers include methyl(meth) acrylates, ethyl(meth)acrylates, propyl(meth)acrylates, butyl (meth)acrylates, 2-ethylhexyl(meth)acrylates, hydroxyethyl (meth)acrylates, hydroxybutyl(meth)acrylates, cyclohexyl (meth)acrylates, acrylic acids, methacrylic acids, glycidyl methacrylate, 4-hydroxybutyl acrylate glycidyl ether, 2-(acetoacetoxy)ethyl methacrylate (AAEM), diacetone acrylamide, acrylamide, methacrylamide, methylol(meth)acrylamide, styrene, a-methyl styrene, vinyl toluene, vinyl acetate, vinyl propionate, allyl methacrylate, and combinations thereof. Preferred concentrations of the chain-extending monomers in the acetoacyl-functional polymer range from about 30% by weight to about 90% by weight, more preferably from about 40% by weight to about 80% by weight, and even more preferably from about 50% by weight to about 70% by weight, based on the entire weight of the acetoacyl-functional polymer The acetoacyl-functional polymer may also incorporate additional monomer units, such as aromatic groups, epoxy crosslinkable groups, urethane linkages, and combinations thereof. Examples of preferred additional monomer units include aromatic monomers, such as styrene. Preferred concentrations of the aromatic monomers in the acetoacyl-functional polymer range from about 1% by weight to about 75% by weight, more preferably from about 10% by weight to about 60% by weight, and even more preferably from about 15% by weight to about 50% by weight, based on the entire weight of the acetoacyl-functional polymer.

The acetoacyl-functional polymer also desirably includes an organic backbone structure (i.e., includes carbon atoms), and may also include atoms of hydrogen, nitrogen, and/or oxygen. Preferred concentrations of substituted or unsubstituted hydrocarbon chains in the backbone structure of the acetoacyl-functional polymer include at least about 75% by weight, more preferably at least about 85% by weight, and even more preferably at least about 95% by weight, based on the entire weight of the backbone structure of the acetoacyl-functional polymer. The acetoacyl-functional polymer also desirably includes no more than low concentrations of [—SiO—] siloxane units. Siloxane units are typically reactive with amine-functional compounds, and may readily gel when combined with the crosslinking agent of the coating composition. The increased gellation rate may thereby decrease the pot life of the coating composition. Accordingly, preferred concentrations of siloxane units in the acetoacyl-functional polymer include less than 5% by weight, and more preferably less than 1% by weight, based the entire weight of the acetoacyl-functional polymer. Even more preferably, the acetoacyl-functional polymer is substantially free (e.g., less than about five siloxane units) or is free of siloxane units.

The above-discussed monomers may be polymerized via a free-radical reaction to form the acetoacyl-functional polymer. In one embodiment, the free-radical reaction may be performed as a solution polymerization process in which the monomers may be suspended in a solvent containing a free-radical initiator. As used herein, the terms "suspend", "suspended", "suspending", "suspension", and the like, with reference to a solid or partially solid material in a solvent, refer to the material being dispersed, dissolved, solubilized, emulsified, and/or otherwise generally uniformly distributed in the solvent. Suitable solvents for the solution polymerization process include non-reactive organic solvents. In one embodiment, the solvent for the solution polymerization includes one or more ketone compounds. Suitable free-radical initiators include any initiator capable of inducing a free-radical reaction. The reactants may also be exposed to one or more elevated temperatures and/or actinic radiation (e.g., ultraviolet radiation) to induce the free-radical reaction.

In some embodiments, the polymerization may be performed in multiple, successive steps. For example, intermediate oligomers and co-oligomers may be initially formed from the monomer units, and the oligomers and co-oligomers may then by polymerized to form the acetoacyl-functional polymer. In alternative embodiments, the free-radical reaction may be performed as a non-solution polymerization process, and the resulting acetoacyl-functional polymer may then be suspended in a solvent. In further alternative embodiments, the backbone may be initially formed from a polymerization process, and the acetoacyl-functional groups may then be subsequently added as pendant chains to the backbone. For example, one or more diketenes may be reacted onto a backbone having one or more hydroxyl-functional groups. Preferred number average molecular weights of the resulting acetoacyl-functional polymer range from about 500 to about 500,000, more preferably from about 1,000 to about 200,000, and even more preferably from about 20,000 to about 100,000.

After the polymerization process is complete, the acetoacyl-functional polymer may then be used as a binder resin for the coating composition of the present disclosure. Preferred concentrations of the at least one acetoacyl-functional polymer in the coating composition range from about 5% by weight to about 80% by weight, more preferably from about 10% by weight to about 70% by weight, and even more preferably from about 15% by weight to about 50% by weight, based on an entire weight of the coating composition.

As used herein, the term "entire weight of the coating composition" refers to the combined weights of the materials of the coating composition for single-component systems and for multiple-component systems, where, in a multiple-component system, the combined weights of the materials include the materials from each of the multiple components, and where the combined weights of the materials add up to 100%. For example, in a two-component system, the "entire weight of the coating composition" is based on the combined weights of the materials as if the two components are mixed together.

In some embodiment, the coating composition may include a blend of multiple acetoacyl-functional polymers having different glass transition temperatures. For example, the coating composition may include a first acetoacyl-functional polymer having a lower glass transition temperature, and a second acetoacyl-functional polymer having a higher glass transition temperature. Preferred glass transition temperatures for the first acetoacyl-functional polymer range from about 10° C. to about 60° C., more preferably from about 10° C. to about 40° C., and even more preferably from about 15° C. to about 30° C. Correspondingly, preferred glass transition temperatures for the second acetoacyl-functional polymer range from about 60° C. to about 100° C., more preferably from about 65° C. to about 95° C., and even more preferably from about 70° C. to about 90° C. The coating composition may also include acetoacyl-functional polymers having one or more intermediate glass transition temperatures. The glass transition temperatures used herein are based on atmospheric pressure measurements.

As discussed above, the coating composition also desirably includes an organic solvent. Examples of suitable organic solvents include methanol, ethanol, isopropyl alcohol, butyl alcohols (e.g., n-butanol), 2-butoxyethanol, 2-(2-butoxyethoxy)ethanol (i.e., butyl carbitol), glycol ethers, diglymes, toluene, xylene, CFS compounds, and combinations thereof. Preferred concentrations of the organic solvent in the coating composition include at least about 10% by weight, more preferably at least about 30% by weight, even more preferably from about 40% by weight to about 85% by weight, and even more preferably from about 50% by weight to about 75% by weight, based on the entire weight of the coating composition.

In embodiments in which the organic solvent includes or consists essentially of at least one CFS compound, the coating composition may exhibit an extended pot life, thereby allowing the coating composition to be used in single-component delivery systems over extended time periods after the components are mixed. As used herein, the terms "carbonyl-functional solvent compound" and "CFS compound" each refer to a compound that includes at least one carbonyl group, and that has a boiling point temperature less than about 250° C. at 101.3 kilopascals (one atmosphere), where the term "carbonyl group" refers to a group having a carbon atom double-bonded to an oxygen atom. As also used herein, the term "solvent-based carbonyl group" refers to a carbonyl group attained from at least one CFS compound, as opposed to a carbonyl group attained from a polymer, such as the acetoacyl-functional polymer.

As discussed below, the coating composition preferably includes a sufficient concentration of solvent-based carbonyl groups (from the at least one CFS compound) to desirably extend the pot life of the coating composition. The concentration of solvent-based carbonyl groups in the coating composition may be determined by the following formula:

$$\text{Wt \%(carbonyl)} = \sum_{i=1}^{n} \frac{M(\text{carbonyl}) \times \text{Wt \%}(CFS)}{M(CFS)}_i \quad \text{(Equation 1)}$$

where "Wt % (carbonyl)" is the concentration by weight of the solvent-based carbonyl groups in the coating composition, "n" is the total number of CFS compounds in the coating composition, "M(carbonyl)" is the combined molecular masses of carbonyl groups for a CFS compound(i) (i.e., about 28.0 atomic mass units (amu) per carbonyl group), "Wt % (CFS)" is the concentration by weight of the CFS compound (i), and "M(CFS)" is the molecular mass of the CFS compound(i), where the concentrations are based on the entire weight of the coating composition.

Preferred concentrations of solvent-based carbonyl groups in the coating composition include at least about 15% by weight, more preferably from about 20% by weight to about 40% by weight, and even more preferably from about 25% by weight to about 35% by weight, based on the entire weight of the coating composition. In preferred embodiments, the CFS compound(s) are provided in a sufficient concentration to provide a pot life that is greater than a pot life attainable with an equal concentration of xylene. Preferred concentrations of the CFS compound(s) in the coating composition include at least about 30% by weight, more preferably from about 40% by weight to about 85% by weight, and even more preferably from about 50% by weight to about 75% by weight, based on the entire weight of the coating composition.

Examples of suitable CFS compounds for use in the organic solvent include ketones, esters, acyl halides, amides, substituted amides, carbonates, and combinations thereof. Examples of suitable ketones include propanone (i.e., dimethyl ketone, acetone), butanone (i.e., methyl ethyl ketone), pentanones (e.g., methyl propyl ketone, diethyl ketone, and cyclopentanone), hexanones (e.g., methyl butyl ketone, ethyl propyl ketone, and cyclohexanone, diacetone alcohol), heptanones (e.g., methyl n-amyl ketone), -, diisobutyl ketone, isophorone, and combinations thereof. Examples of suitable esters include methyl acetate, ethyl acetate, propyl acetate, butyl acetate, and combinations thereof. An example of a suitable amide includes 2-pyrrolidone. Examples of suitable substituted amides include n-methyl-2-pyrrolidone, n-ethyl-2-pyrrolidone, 1,3-dimethyl-2-imidazolidinone, and combinations thereof. Examples of suitable carbonates include ethylene carbonates, propylene carbonates, and combinations thereof.

Attaining sufficient concentrations of solvent-based carbonyl groups in the coating composition may be attained by balancing the concentrations of the CFS compound(s) in the coating composition and the molecular masses of the respective CFS compound(s). In general, low-molecular mass CFS compounds may be present in lower concentrations of the coating composition compared to higher-molecular mass CFS compounds, which are desirably present in relatively higher concentrations of the coating composition. For example, to attain about 25.0% by weight concentration of solvent-based carbonyl groups in the coating composition, a concentration of about 51.8% by weight of dimethyl ketone (about 58.1 amu) may be used, a concentration of about 77.0% by weight of methyl propyl ketone (about 86.1 amu) may be used, or combined concentrations of dimethyl ketone and of methyl propyl ketone may be used (e.g., about 40.0% by weight dimethyl ketone and about 17.5% by weight methyl propyl ketone). Preferred molecular masses for the CFS compound(s) include molecular masses less than about 200 amu, more preferably less than about 150 amu, even more preferably less than about 120 amu, even more preferably less than about 100 amu, and most preferably less than about 75 amu.

In some embodiments, CFS compound(s) may be selected to provide a balance between pot life for the coating composition and volatility of the CFS compound(s). In these embodiments, preferred molecular masses for the CFS compound(s) range from about 50 amu to about 150 amu, more preferably ranging from about 50 amu to about 120 amu, and most preferably ranging from about 50 amu to about 100 amu.

In some additional embodiments, in which the coating composition includes one or more additional non-CFS solvents, preferred combined concentrations of the additional non-CFS solvents in the coating composition include less than about 35% by weight, more preferably less than about 15% by weight, and even more preferably less than about 5% by weight, based on the entire weight of the coating composition. In one embodiment, the solvent portion of the coating composition consists essentially of the CFS compound(s).

Furthermore, to provide a solvent-borne system, the coating composition desirably exhibits low concentrations of water, or more preferably, is free of water. In embodiments in which the coating composition includes water, preferred concentrations of water in the coating composition include less than about 40% by weight, more preferably less than about 15% by weight, even more preferably less than about 5% by weight, and even more preferably less than about 1% by weight, based on the entire weight of the coating composition.

The crosslinking agent of the coating composition may be any agent capable of crosslinking the acetoacyl-functional polymer to form a coating for a substrate, such as a wood substrate. Suitable crosslinking agents for use in the coating composition include those having amine-functional groups, imine-functional groups, and combinations thereof. Examples of suitable crosslinking agents for use in the coating composition include polyamines; polyetheramines, such as those commercially available under the trade designation "JEFFAMINE" from Hunstman Corporation, The Woodlands, Tex.; aliphatic and cycloaliphatic alkyl diamines such as ethylene diamine, 1,2-propane diamine, 1,3-propane diamine, neopentane diamine, hexamethylene diamine, octamethylene diamine, isophorone diamine, 4,4'-diaminodicyclohexylmethane, 2,2'-dimethyl-4,4'-methylenebis(cyclohexylamine) which are commercially available from BASF, Florham Park, N.J.; polyamines such as diethylenetriamine, triethylene tetramine, tetraethylene pentamine, and aromatic diamines commercially available from Air Products, Allentown, Pa.; compounds containing dihydrazides, such as adipic dihydrazide, or carbohydrazide; compounds containing ketimine-functional groups; compounds containing aldimine-functional groups; and combinations thereof. In one embodiment, the coating composition may be substantially free (e.g., less than about 0.5% by weight in the coating composition) of chelating agents, such as aluminum catalysts, or more preferably is free of chelating agents.

Preferred concentrations of the at least one crosslinking agent in the coating composition range from about 0.1% by weight to about 10.0% by weight, more preferably from about 1.0% by weight to about 8.0% by weight, and even more preferably from about 1.5% by weight to about 5.0% by weight, based on the entire weight of the coating composition. Furthermore, preferred weight-based concentration ratios of the crosslinkable group(s) of the acetoacyl-functional polymer (e.g., acetoacyl-functional groups) to the crosslinking agent(s) range from about 0.5:1 to about 5:1, more preferably from about 1:1 to about 4:1, and even more preferably from about 1.5:1 to about 3:1.

Prior to application on a substrate, the crosslinking agent is desirably maintained separate from the acetoacyl-functional polymer to prevent premature crosslinking during storage. Thus, the coating composition may be provided as a two-component system, where the first component may include the acetoacyl-functional polymer suspended in the organic solvent, and where the second component may include the crosslinking agent. Alternatively, the organic solvent may be included with the crosslinking agent in the second component, or may be provided in both the first and second components. In additional alternative embodiments, the coating composition may be provided as a single-component system.

The coating composition may also include one or more adjuvants, which may be included in the first component and/or the second component of the coating composition. Examples of suitable adjuvants for the coating composition include surfactants, rheology-modifying agents, colorants, heat stabilizers, flow/leveling agents, matting agents, sedimentation inhibitors, photo stabilizers, biological agents, plasticizers, and combinations thereof.

Suitable surfactants for use in the coating composition include wetting agents, emulsifying agents, suspending agents, dispersing agents, and combinations thereof. Examples of suitable surfactants for use in the coating composition include non-ionic and anionic surfactants, organosilicone compounds, fluorocarbon surfactants, and combinations thereof. Examples of commercially available surfactants for the coating composition include those available under the trade designation "BYK" from BYK-Chemie GmBH, Wesel, Germany; under the trade designation "SIL-WET" from OSI Specialties, Inc., South Charleston, W. Va.; and under the trade designations "SURFYNOL" from Air Products and Chemicals, Inc., Allentown, Pa. Preferred concentrations of the surfactants in the coating composition range from about 0.01% by weight to about 5.0% by weight, more preferably from about 0.1% by weight to about 3.0% by weight, and even more preferably from about 0.1% by weight to about 2.0% by weight, based on the entire weight of the coating composition.

Suitable rheology-modifying agents for the coating composition include thixiotropic materials, fillers, and thickeners. Examples of suitable thixiotropic materials include polyamides, oxidized polyethylenes, and combinations thereof. Examples of suitable fillers include silicon dioxides, talc, wollastonites, mica, alumina trihydrates, clays, silica quartz, calcium carbonates, magnesium carbonates, barium carbonates, calcium sulfates, magnesium sulfates, and combinations thereof. Preferred concentrations of rheology-modifying agents in the coating composition range from about 0.1% by weight to about 5.0% by weight, more preferably from about 0.1% by weight to about 2.0% by weight, and even more preferably from about 0.1% to about 1.0% by weight, based on the entire weight of the coating composition.

For applications in which the applied coating is opaque, colored, and/or has other visual characteristics, one or more colorants (e.g., pigments and dyes) may be incorporated into the coating composition. For example, suitable pigments include titanium dioxide white, carbon black, lampblack, black iron oxide, red iron oxide, yellow iron oxide, brown iron oxide, phthalocyanine green, phthalocyanine blue, organic reds, quinacridone magenta, quinacridone violet, DNA orange, organic yellows, and combinations thereof. The concentrations of the colorants in the coating composition may vary depending on the desired visual effects. Preferred concentrations of colorants in the coating composition range from about 0.1% by weight to about 30% by weight, more preferably from about 0.5% by weight to about 20% by weight, and even more preferably from about 1% to about 10% by weight, based on the entire weight of the coating composition.

Suitable photostabilizers include UV-light absorbers, blockers, and stabilizers, such as hindered amine compounds, tris-aryl triazine compounds, benzotriazoles, benzophenone, benzoxazinone compounds, cyanoacrylate compounds, amide functional compounds, and combinations thereof. Examples of suitable commercially available photostabilizers include benzotriazoles available under the trade designation "TINUVIN" from Ciba Specialty Chemicals, Tarrytown, N.Y.; and benzophenones available under the trade designation "SANDUVOR" from Clariant Corporation, Charlotte, N.C. Preferred concentrations of photostabilizers in the coating composition range from about 0.01% by weight to about 5% by weight, more preferably from about 0.05% by weight to about 2% by weight, and even more preferably from about 0.1% to about 1% by weight, based on the entire weight of the coating composition.

The coating composition may be applied to a variety of different substrates using conventional application techniques. Examples of suitable substrate materials include wood, cement, cement fiber board, wood-plastic composites, tile, metal, plastic, glass, and fiberglass. As discussed above, the coating composition is desirably provided as a two-component system in which the acetoacyl-functional polymer and the crosslinking agent are separated prior to application. Accordingly, prior to or at the time of applying the coating composition to a substrate, the two components may be mixed together. As with many compositions that undergo catalyzed polymerization (e.g., epoxy and polyurethane compositions), once the components of the coating composition are mixed together, the crosslinking agent attempts to initiate the crosslinking of the acetoacyl-functional polymers.

After mixing, the coating composition may be applied to a substrate, upon which the organic solvent may evaporate. The evaporation process may be performed passively and/or with an active application of heat. Upon at least partial evaporation of the solvent, the resulting resin may then crosslink with good crosslinking efficiencies to provide a durable crosslinked coating. The thickness of the formed coating may vary depending on the desired application and coating properties. Preferred coating thicknesses range from about 0.01 millimeters (about 0.5 mils) to about 0.5 millimeters (about 20 mils), more preferably from about 0.02 millimeters (about 1 mil) to about 0.25 millimeters (about 10 mils), and even more preferably from about 0.02 millimeters (about 1 mil) to about 0.13 millimeters (about 5 mils).

While not wishing to be bound by theory, it is believed that the combination of the acetoacyl-functional polymer with the CFS compound(s) reduces the crosslinking rate while the CFS compound(s) are present (i.e., reduces the gelling effect). In particular, while not wishing to be bound by theory, it is believed that the solvent-based carbonyl groups of the CFS compound(s) compete with the acetoacyl-functional polymer, thereby at least partially blocking the crosslinking agents from reacting with the acetoacyl-functional polymer. This accordingly reduces the concentration of crosslinking agents that may react with the acetoacyl-functional polymer while the CFS compound(s) are present, which may correspondingly extend the pot life of the coating composition. Again, while not wishing to be bound by theory, it is believed that the removal of the CFS compound(s) from the mixed coating composition may allow greater concentrations of the crosslinking agents to react with the acetoacyl-functional polymer.

Due to the extended pot file, the coating composition may be used in single-component delivery systems over extended time periods after the components are mixed. This is beneficial for many industrial environments where there may be delays between when the coating composition is mixed and when it is applied to a substrate. Accordingly, the coating compositions of the present disclosure are preferably capable of attaining pot lives of at least about 6 hours, more preferably of at least about 7 hours, and even more preferably of at least 8 hours. In some embodiments, such as those in which the coating composition includes CFS compound(s) having greater volatilities, the coating compositions of the present disclosure are capable of attaining pot lives greater than about 10 hours, greater than about 30 hours, and even greater than about 50 hours.

As discussed above, the coating composition may also be particularly suitable for use on wood substrates. Suitable wood substrates include substrates derived from wood materials such as oak (e.g., white oak and red oak), pine (e.g., white pine and southern yellow pine), poplar, spruce, cherry, walnut, redwood, cedar, maple, mahogany, birch, hickory, walnut, ash, and the like. Preferred wood materials for the wood substrate include those that exhibit light colors and are susceptible to UV-light discolorations, such as oak, pine, maple, and the like. Preferred woods may also have colors ($\Delta E$) against standard white of about 30 or less, and more preferably of about 20 or less. In addition, the wood substrate may be an engineered wood product, in which the substrate is prepared from wood pieces (e.g., sheets, chips, flakes, fibers, strands).

The coating desirably provides resistance to chemicals, moisture, and ultraviolet (UV)-light exposure, thereby protecting the underlying wood substrate from weathering conditions. For example, as discussed below, the coating may reduce discoloration of a maple wood substrate by almost six times compared to an uncoated maple wood substrate after being exposed to UVb radiation for a 240-hour period. Similarly, the coating may reduce discoloration of an oak wood substrate by almost four times compared to an uncoated oak wood substrate after being exposed to UVb radiation for a 240-hour period.

Accordingly, for a given wood substrate the coated article preferably exhibits at least three times less discoloration than the wood substrate in an uncoated state, after being exposed to UVb radiation for a 240-hour period, more preferably at least four times lower, and even more preferably at least five times lower. As used herein, this discoloration comparison is based on a coating thickness of about 0.76 millimeters (about 3 mils), and a 240-hour exposure to UVb light in a UV box equipped with three UVb-313 bulbs (40-watt bulbs commercially available from Q Panel Corporation, Cleveland, Ohio) at 25° C. and ambient humidity. The discoloration ($\Delta E$) is measured with a spectrophotometer (commercially available under the trade designation "SPECTRAFLASH" SF650X, Part No. 4220-0923M, 2004, from Datacolor Corporation, Lawrenceville, N.J.), and the measurement is taken pursuant to the spectrophotometer manual with a reading taken under a CIE Standard Illuminant D65 10° light source.

As discussed above, the coating composition is a solvent-borne coating composition that may be used to form protective and aesthetic coatings on a variety of substrates. In some embodiments, the coating composition may include one or more CFS compounds as a solvent for the acetoacyl-functional polymer(s), thereby providing a good pot life for the coating composition. In additional embodiments, which may or may not include the CFS compound(s), coatings formed from the coating composition are suitable for use on wood substrates and desirably provide resistance to chemicals, moisture, and ultraviolet (UV)-light exposure. Additionally, the use of the acetoacyl-functional polymer also desirably prevents emissions of formaldehyde or other compounds (e.g., isocyanates and aziridines) during the crosslinking process.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Pot Life Testing

Coating compositions of Runs 1-18 were prepared to quantitatively compare the pot lives and gel times of the respective coating compositions. The coating compositions were prepared by initially preparing acetoacyl-functional acrylic resins, referred to as AA resins 1 and 2, where the coating compositions of Runs 1-12 incorporated the AA resin 1 and the coating compositions of Runs 13-18 incorporated the AA resin 2. Table 1 lists the component concentrations of the AA resins 1 and 2.

TABLE 1

| Component | AA Resin 1 (Percent by Weight) | AA Resin 2 (Percent by Weight) |
| --- | --- | --- |
| Methyl-n-amyl ketone | 48.7 | 48.7 |
| AAEM | 9.6 | 9.6 |
| Methyl methacrylate | 17.1 | 30.6 |
| Butyl acrylate | 13.6 | 0.1 |
| Styrene | 10.1 | 10.1 |
| Free-radical initiator | 0.9 | 0.9 |

The methyl-n-amyl ketone was commercially available under the trade designation "Eastman MAK" from Eastman Chemical company, Kingsport, Tenn.; the AAEM was an acetoacetoxyethyl methacrylate commercially available under the trade designation "EASTMAN AAEM" from Eastman Chemical company, Kingsport, Tenn.; the methyl methacrylate and the butyl acrylate were each commercially available from Rohm and Haas Company, North Olmsted, Ohio; the styrene was commercially available from Lyondell Chemical Company, Houston, Tex.; and the free-radical initiator was a 2,2'-azobis(2-methylbutyronitrile) commercially available under the trade designation "VAZO 67" from E.I. du Pont de Nemours and Company, Wilmington, Del.

The AA resins 1 and 2 were each prepared by initially mixing the AAEM, the methyl methacrylate, and the styrene to form a monomer feed in a first container. The free-radical initiator and about 4% by weight of the methyl-n-amyl ketone were also separately mixed in a second container to form an initiator premix. About 78% by weight of the methyl-n-amyl ketone was then heated in a reaction flask under a nitrogen blanket and a condenser to 145° C. The monomer feed and the initiator premix were then simultaneously fed to the third flask over a 4.5-hour period under stirring agitation, and while maintaining the 145° C. temperature. This initiated a free-radical polymerization of the monomer feed.

After the 4.5-hour period, the first container (which previously contained the monomer feed) was rinsed with about 4% by weight of the methyl-n-amyl ketone, and the rinsed contents were emptied into the reaction flask. Correspondingly, the second container (which previously contained the initiator premix) was rinsed with about 14% by weight of the methyl-n-amyl ketone, and the rinsed contents were also emptied into the reaction flask. The reaction flask was then maintained at 145° C. for an additional 30 minutes. The resulting resin was then cooled and removed from the reaction flask. The AA resins 1 and 2 each had a solids concentration of 50.5% by weight, and was clear. The AA resins 1 and 2 were then dried in an oven at 90° C. to remove the methyl-n-amyl ketone. The dried AA resin 1 had glass transition temperature of 20° C. and the dried AA resin 2 had glass transition temperature of 80° C.

1. Runs 1-6

The coating compositions of Runs 1-6 were prepared by mixing the dried AA resin 1 with a surfactant, a crosslinking agent, and different organic solvents. Table 2 lists the component concentrations of the coating compositions of Runs 1-6.

TABLE 2

| Component | Run 1 | Run 2 | Run 3 | Run 4 | Run 5 | Run 6 |
| --- | --- | --- | --- | --- | --- | --- |
| AA-Functional Resin 1 | 33.0 | 33.0 | 33.0 | 33.0 | 33.0 | 33.0 |
| Wetting agent | 0.2 | 0.2 | 0.2 | 0.2 | 0.2 | 0.2 |
| Polyetheramine | 1.8 | 1.8 | 1.8 | 1.8 | 1.8 | 1.8 |
| Dimethyl ketone | 65.0 | 0.0 | 0.0 | 0.0 | 0.0 | 0.0 |
| Methyl ethyl ketone | 0.0 | 65.0 | 0.0 | 0.0 | 0.0 | 0.0 |
| Methyl n-propyl ketone | 0.0 | 0.0 | 65.0 | 0.0 | 0.0 | 0.0 |
| Methyl n-amyl ketone | 0.0 | 0.0 | 0.0 | 65.0 | 0.0 | 0.0 |
| n-butyl acetate | 0.0 | 0.0 | 0.0 | 0.0 | 65.0 | 0.0 |
| Xylene | 0.0 | 0.0 | 0.0 | 0.0 | 0.0 | 65.0 |

The wetting agent was a polyether modified dimethylpolysiloxane-copolymer solution commercially available under the trade designation "BYK 300" from BYK-Chemie GmBH, Wesel, Germany; and the crosslinking agent was a polyetheramine commercially available under the trade designation "JEFFAMINE T-403" from Hunstman Corporation, The Woodlands, Tex.

As shown in Table 2, the coating compositions of Runs 1-4 included ketone-based CFS compounds that increase in size (i.e., having increasing molecular masses). The coating composition of Run 5 included n-butyl acetate, which is an ester-based CFS compound. In comparison, the coating composition of Run 6 included xylene, which is an aromatic solvent that does not include any carbonyl groups. For each of the coating compositions of Runs 1-6, the concentration of solvent-based carbonyl groups in the respective coating composition was determined pursuant to Equation 1, discussed above. Accordingly, the combined concentration of solvent-based carbonyl groups in each coating composition was based on the concentration of the respective CFS compound in the coating composition and the molecular mass of the respective CFS compound.

Once each coating composition was mixed to combine the acetoacyl-functional polymer with the crosslinking agent, the dynamic viscosity of the given coating composition was measured to provide an initial dynamic viscosity reading. The dynamic viscosities were measured using an efflux cup commercially available under the trade designation "GARDCO EZ Series #2 Zahn Cup" from Paul N. Gardner Co., Inc., Pompano Beach, Fla., and a stopwatch. The efflux cup was dipped into the coating composition and allowed to fill, and then was quickly removed from the liquid so that the bottom of the efflux cup was approximately six inches above the surface of the liquid. The stopwatch was then started at the moment that the efflux cup was removed from the liquid and was stopped when the stream of fluid leaving the hole in the bottom of the cup was no longer substantially continuous. After the initial measurement, the viscosity of each coating composition was also periodically measured to identify when the viscosity of the given coating composition doubled. This time period between the initial mixing and when the viscosity doubled was recorded as the pot life of the given coating composition. The viscosity measurements were taken at 23° C. The time period required for each coating composition to gel was also recorded. Table 3 lists the initial dynamic viscosity, the pot life, and the gel time for coating compositions of Runs 1-6. Table 3 also lists the concentrations of solvent-based carbonyl groups in each of the coating compositions of Runs 1-6, where the concentrations are based on the entire weight of the respective coating composition.

TABLE 3

| Test Run | Percent by Weight Carbonyl Groups | Initial Dynamic Viscosity (Seconds) | Pot Life (Hours) | Gel Time (Hours) |
|---|---|---|---|---|
| Run 1 | 31.3 | 17.2 | 62.0 | 74.0 |
| Run 2 | 25.2 | 17.4 | 49.0 | 57.8 |
| Run 3 | 21.1 | 17.6 | 12.0 | 15.8 |
| Run 4 | 15.9 | 20.1 | 5.2 | 7.0 |
| Run 5 | 15.7 | 19.8 | 7.0 | 10.0 |
| Run 6 | 0.0 | 19.4 | 5.8 | 7.5 |

As shown in Table 3, the concentrations of solvent-based carbonyl groups in the coating compositions of Runs 1-5 decrease with the increase in size (i.e., molecular mass) of the respective CFS compound. As discussed above, because the concentration of each CFS compound in the coating compositions of Runs 1-5 was the same (i.e., 65% by weight), the increasing sizes of the CFS compounds in the respective coating compositions resulted in fewer numbers of solvent-based carbonyl groups being present in the respective coating compositions.

As further shown in Table 3, the pot life results of the coating compositions were proportional to the concentrations of solvent-based carbonyl groups in the respective coating compositions. For example, the coating compositions of Runs 1-3, which had high concentrations of solvent-based carbonyl groups, exhibited longer pot lives relative to the coating compositions of Runs 4-6, which had lower concentrations of solvent-based carbonyl groups. This was particularly true for the coating compositions of Runs 1 and 2. As discussed above, while not wishing to be bound by theory, it is believed that the solvent-based carbonyl groups of the CFS compound(s) compete with the acetoacyl-functional polymer, thereby at least partially blocking the crosslinking agents from reacting with the acetoacyl-functional polymer. This accordingly reduces the concentration of crosslinking agents that may react with the acetoacyl-functional polymer while the CFS compound(s) are present.

2. Runs 7-12

The coating compositions of Runs 7-12 were prepared by mixing the dried AA resin 1 with a surfactant, a crosslinking agent, and different organic solvents. However, in comparison to the coating compositions of Runs 1, 5, and 6, the coating compositions of Runs 7-9 included solvent blends of dimethyl ketone and n-buytl acetate. Similarly, the coating compositions of Runs 10-12 included solvent blends of dimethyl ketone and xylene. Table 4 lists the component concentrations of the coating compositions of Runs 7-12.

TABLE 4

| Component | Run 7 | Run 8 | Run 9 | Run 10 | Run 11 | Run 12 |
|---|---|---|---|---|---|---|
| AA Resin 1 | 33.0 | 33.0 | 33.0 | 33.0 | 33.0 | 33.0 |
| Wetting agent | 0.2 | 0.2 | 0.2 | 0.2 | 0.2 | 0.2 |
| Crosslinking agent | 1.8 | 1.8 | 1.8 | 1.8 | 1.8 | 1.8 |
| Dimethyl ketone | 48.8 | 32.5 | 16.3 | 48.8 | 32.5 | 16.3 |
| n-butyl acetate | 16.3 | 32.5 | 48.8 | 0.0 | 0.0 | 0.0 |
| Xylene | 0.0 | 0.0 | 0.0 | 16.3 | 32.5 | 48.8 |

The coating compositions of Runs 7-12 also underwent the viscosity measurement test, as discussed above for Runs 1-6. Furthermore, for each of the coating compositions of Runs 7-12, the concentration of solvent-based carbonyl groups in the respective coating composition was determined pursuant to Equation 1, discussed above. Table 5 lists the concentrations of solvent-based carbonyl groups, the initial dynamic viscosity, the pot life, and the gel time for coating compositions of Runs 7-12.

TABLE 5

| Test Run | Percent by Weight Carbonyl Groups | Initial Dynamic Viscosity (Seconds) | Pot Life (Hours) | Gel Time (Hours) |
|---|---|---|---|---|
| Run 7 | 27.5 | 17.4 | 46.0 | 57.0 |
| Run 8 | 23.5 | 18.2 | 22.0 | 31.0 |
| Run 9 | 19.6 | 19.1 | 9.8 | 13.0 |
| Run 10 | 23.5 | 17.3 | 24.0 | 32.0 |
| Run 11 | 15.7 | 18.0 | 14.0 | 18.5 |
| Run 12 | 7.9 | 18.9 | 7.5 | 11.0 |

As shown in Table 5, exemplary coating compositions of the present disclosure may also include blends of CFS compounds, where the concentrations of solvent-based carbonyl groups may be attained from each CFS compound in the solvent blend. For example, a comparison of Runs 7-9 illustrate how the average size of the CFS compounds may affect the concentration of solvent-based carbonyl groups in the coating composition. In particular, as the average size of the CFS compounds increases, the concentration of solvent-based carbonyl groups decrease. As discussed above, the decrease in concentration of solvent-based carbonyl groups may correspondingly decrease the pot life of the respective coating composition. The results of Runs 10-12 in Table 5 also illustrate that exemplary coating compositions of the present disclosure may include solvent blends with non-CFS compounds (e.g., xylene).

3. Runs 13-18

The coating compositions of Runs 13-18 were prepared by mixing the dried AA resin 2 with a surfactant, a crosslinking agent, and different organic solvents. The organic solvents used for the coating compositions of Runs 13-18 respectively correspond to those used for the coating compositions of Runs 1-6. Table 6 lists the component concentrations of the coating compositions of Runs 13-18.

TABLE 6

| Component | Run 13 | Run 14 | Run 15 | Run 16 | Run 17 | Run 18 |
|---|---|---|---|---|---|---|
| AA Resin 2 | 33.0 | 33.0 | 33.0 | 33.0 | 33.0 | 33.0 |
| Wetting agent | 0.2 | 0.2 | 0.2 | 0.2 | 0.2 | 0.2 |
| Crosslinking agent | 1.8 | 1.8 | 1.8 | 1.8 | 1.8 | 1.8 |
| Dimethyl ketone | 65.0 | 0.0 | 0.0 | 0.0 | 0.0 | 0.0 |
| Methyl ethyl ketone | 0.0 | 65.0 | 0.0 | 0.0 | 0.0 | 0.0 |
| Methyl n-propyl ketone | 0.0 | 0.0 | 65.0 | 0.0 | 0.0 | 0.0 |
| Methyl n-amyl ketone | 0.0 | 0.0 | 0.0 | 65.0 | 0.0 | 0.0 |

TABLE 6-continued

| Component | Run 13 | Run 14 | Run 15 | Run 16 | Run 17 | Run 18 |
|---|---|---|---|---|---|---|
| n-butyl acetate | 0.0 | 0.0 | 0.0 | 0.0 | 65.0 | 0.0 |
| Xylene | 0.0 | 0.0 | 0.0 | 0.0 | 0.0 | 65.0 |

The coating compositions of Runs 13-18 also underwent the viscosity measurement test, as discussed above for Runs 1-6. For each of the coating compositions of Runs 13-18, the concentration of solvent-based carbonyl groups in the respective coating composition was determined pursuant to Equation 1, discussed above. Table 7 lists the concentrations of solvent-based carbonyl groups, the initial dynamic viscosity, the pot life, and the gel time for the coating compositions of Runs 13-18.

TABLE 7

| Test Run | Percent by Weight Carbonyl Groups | Initial Dynamic Viscosity (Seconds) | Pot Life (Hours) | Gel Time (Hours) |
|---|---|---|---|---|
| Run 13 | 31.3 | 17.7 | 57.5 | 65.5 |
| Run 14 | 25.2 | 18.0 | 45.8 | 51.5 |
| Run 15 | 21.1 | 19.1 | 8.3 | 12.3 |
| Run 16 | 15.9 | 27.8 | 3.7 | 5.3 |
| Run 17 | 15.7 | 24.1 | 5.8 | 8.8 |
| Run 18 | 0.0 | 25.3 | 4.3 | 6.8 |

As shown in Table 7, the concentrations of solvent-based carbonyl groups in the coating compositions of Runs 13-17 also decrease with the increase in size (i.e., molecular mass) of the respective CFS compound. This corresponds to the results shown above for Runs 1-6 in Table 3. As further shown in Table 7, the pot life results of the coating compositions are also proportional to the concentration of solvent-based carbonyl groups in the respective coating compositions. These results also correspond to the results shown above for Runs 1-6 in Table 3. Furthermore, a comparison of the results shown in Tables 3 and 7 show that the acetoacyl-functional polymer may contain a variety of different monomer configurations that provide good pot lives for the resulting coating compositions.

Wood Application Testing

Coated wood substrates of Runs 19-21 were prepared and tested for chemical resistance, waterspot resistance, and water soaking resistance to compare the performances of the applied coating compositions. The coated wood substrates of Runs 19-21 and uncoated wood substrates of Runs 22-25 were also tested for UV-light resistance. The coating composition for Run 19 was formed by mixing AA resins 1 and 2 (listed above in Table 1) with a wetting agent, a photostabilizer, and organic solvents. Table 8 lists the component concentrations of the coating composition, where the crosslinking agent was maintained separate from the remaining materials (i.e., a two-part system).

TABLE 8

| Component | Percent by Weight |
|---|---|
| AA Resin 1 | 15.0 |
| AA Resin 2 | 45.0 |
| Wetting agent | 0.2 |
| Photostabilizer | 0.3 |
| Methyl ethyl ketone | 15.7 |
| Dimethyl ketone | 22.0 |
| Crosslinking agent | 1.8 |

The wetting agent was a polyether modified dimethylpolysiloxane-copolymer solution commercially available under the trade designation "BYK 300" from BYK-Chemie GmBH, Wesel, Germany; the photostabilizer was a benzophenone commercially available under the trade designation "SANDUVOR 3035" from Clariant Corporation, Charlotte, N.C.; and the crosslinking agent was a polyetheramine commercially available under the trade designation "JEFFAMINE T-403" from Hunstman Corporation, The Woodlands, Tex.

Coatings were formed on sample substrates, including wood substrates, by mixing the coating composition to combine the acetoacyl-functional polymer with the crosslinking agent, and applying the coating composition to the substrates. The organic solvent was then removed and the acetoacyl-functional polymers were allowed to crosslink to form coatings on the substrates.

1. Chemical Resistance Performance

A coated wood substrate of Run 19 was subjected to a chemical resistance test pursuant to American National Standards Institute (ANSI) A161.1-1995, which is a certification criteria for wood substrate coatings under the Kitchen Cabinet Manufacturers Association (KCMA). Pursuant to Section 9.3 of ANSI A161.1-1995, three cubic centimeters of mustard was applied to the coating, where the mustard was commercially available under the trade designation "FRENCH'S" Yellow Mustard from Reckitt Benckiser, Inc., Parsippany, N.J. After a one-hour contact period, the mustard was removed from the coated wood substrate, and the change in color ($\Delta E$) due to discoloration from the mustard was measured with a spectrophotometer. The spectrophotometer was commercially available under the trade designation "SPECTRAFLASH" SF650X, Part No. 4220-0923M, 2004, from Datacolor Corporation, Lawrenceville, N.J., and the measurement was taken pursuant to the spectrophotometer manual with a reading taken under a CIE Standard Illuminant D65 10° light source. After a 24-hour recovery period, the change in color at the contact location was re-measured to identify any reduction in discoloration.

Wood substrates coated with control coatings were also subjected to the same chemical resistance test. The first control coating was formed from an acid-catalyzed varnish available under the trade designation "GLOBAL PLUS" Self-Seal Conversion Varnish, Product No. AUF4404, from Valspar Corporation, Wheeling, Ill. ("Run 20"). The second control coating was formed from a polyurethane coating package commercially available under the trade designations "TAF7002" (two parts) and "CXC7000" (one part) from Valspar Corporation, Wheeling, Ill. ("Run 21"). Table 9 lists the changes in color ($\Delta E$) for the coated wood substrates of Runs 19-21.

TABLE 9

| Coating Composition | 1-hour contact period ($\Delta E$) | 24-hour recovery period ($\Delta E$) |
|---|---|---|
| Run 19 | 1.18 | 0.11 |
| Run 20 (acid-catalyzed varnish control) | 13.21 | 4.33 |
| Run 21 (polyurethane control) | 9.51 | 2.77 |

As shown in Table 9, the coated wood substrate of Run 19 exhibited a low level of discoloration compared to the discolorations exhibited by the coated wood substrates of the control Runs 20 and 21. Furthermore, after the 24-hour period, the level of discoloration dropped by a factor of ten.

2. Waterspot Resistance Performance

Coated wood substrates of Runs 19-21 were also subjected to a waterspot resistance test to determine the resistance of the coatings to water infiltration. For each coating, the test involved applying five drops of water to the coated wood substrate, and allowing the waterspot to stand on the coating for a one-hour period at 25° C. The water was then removed and the coating was visually analyzed for any deterioration due to the contact with the water. The coatings from Runs 19 and 21 (polyurethane control) did not exhibit any visual changes from the contact with the water. In comparison, the coating from Run 20 (acid-catalyzed varnish control) whitened at the location of contact due to minor infiltration of the water into the coating.

3. Water Soaking Resistance Performance

Coated substrates of Runs 19-21 were also subjected to a water soaking resistance test to determine the resistance of the coatings to immersion in water. Under this test, the coatings were applied to glass substrates. For each coating, the test involved immersing the coated substrate in water for a one-hour period at 25° C. The coated substrate was then removed from the water and visually analyzed for any deterioration due to immersion in the water. The coatings from Runs 19 and 21 (polyurethane control) did not exhibit any visual changes from the immersion in the water. In comparison, however, the coating from Run 20 (acid-catalyzed varnish control) easily delaminated from the substrate.

4. UV-Light Resistance Performance

Coated substrates of Runs 19-21 were also subjected to a UV-light resistance test to determine the resistance of the coatings and underlying substrates to the UV-light radiation. Under this test, each coating was applied to a maple wood substrate, an oak wood substrate, a pine wood substrate, and a cherry wood substrate.

Each coated substrate was then exposed to UVb light in a UV box equipped with three UVb-313 bulbs (commercially available from Q Panel Corporation, Cleveland, Ohio) at 25° C. After 24-hour, 120-hour, and 240-hour exposure periods, the change in color ($\Delta E$) of the exposed coated substrate was measured with a spectrophotometer in the same manner as discussed above in the Chemical Resistance Performance. This process was also performed on an uncoated maple wood substrate ("Run 22"), an uncoated oak wood substrate ("Run 23"), an uncoated pine wood substrate ("Run 24"), and an uncoated cherry wood substrate ("Run 25").

Table 10 lists the changes in color ($\Delta E$) for the coated maple substrates of Runs 19-21, and for the uncoated maple wood substrate of Run 22, which had a color ($\Delta E$) against standard white of 19.29.

TABLE 10

| Maple Wood Substrate | | | |
|---|---|---|---|
| Coating Composition | 24-hour period ($\Delta E$) | 124-hour period ($\Delta E$) | 240-hour period ($\Delta E$) |
| Run 19 | 0.71 | 1.96 | 2.63 |
| Run 20 (acid-catalyzed varnish control) | 1.22 | 3.77 | 5.91 |
| Run 21 (polyurethane control) | 2.74 | 5.83 | 9.32 |
| Run 22 (uncoated maple wood control) | 7.59 | 13.74 | 15.13 |

Table 11 correspondingly lists the changes in color ($\Delta E$) for the coated oak wood substrates of Runs 19-21, and for the uncoated oak wood substrate of Run 23, which had a color ($\Delta E$) against standard white of 30.70.

TABLE 11

| Oak Wood Substrate | | | |
|---|---|---|---|
| Coating Composition | 24-hour period ($\Delta E$) | 124-hour period ($\Delta E$) | 240-hour period ($\Delta E$) |
| Run 19 | 0.60 | 1.51 | 2.48 |
| Run 20 (acid-catalyzed varnish control) | 0.72 | 1.70 | 2.61 |
| Run 21 (polyurethane control) | 2.27 | 4.14 | 6.78 |
| Run 23 (uncoated oak wood control) | 5.36 | 7.43 | 8.98 |

Table 12 correspondingly lists the changes in color ($\Delta E$) for the coated oak wood substrates of Runs 19-21, and for the uncoated pine wood substrate of Run 24, which had a color ($\Delta E$) against standard white of 19.38.

TABLE 12

| Pine Wood Substrate | | | |
|---|---|---|---|
| Coating Composition | 24-hour period ($\Delta E$) | 124-hour period ($\Delta E$) | 240-hour period ($\Delta E$) |
| Run 19 | 0.95 | 2.14 | 2.87 |
| Run 20 (acid-catalyzed varnish control) | 1.24 | 3.58 | 5.89 |
| Run 21 (polyurethane control) | 2.71 | 6.05 | 10.11 |
| Run 24 (uncoated pine wood control) | 10.37 | 13.55 | 16.97 |

Table 13 correspondingly lists the changes in color ($\Delta E$) for the coated oak wood substrates of Runs 19-21, and for the uncoated cherry wood substrate of Run 25, which had a color ($\Delta E$) against standard white of 34.32.

TABLE 13

| Cherry Wood Substrate | | | |
|---|---|---|---|
| Coating Composition | 24-hour period ($\Delta E$) | 124-hour period ($\Delta E$) | 240-hour period ($\Delta E$) |
| Run 19 | 3.51 | 5.28 | 6.46 |
| Run 20 (acid-catalyzed varnish control) | 4.57 | 5.78 | 6.92 |
| Run 21 (polyurethane control) | 3.87 | 5.44 | 6.83 |
| Run 25 (uncoated cherry wood control) | 8.77 | 9.36 | 10.23 |

The results shown in Tables 10-13 illustrate the UV stability attainable with the coating composition of Run 19. In particular, compared to Runs 20 and 21, the coated composition of Run 19 provided a greater level of UV stability to the underlying wood substrates for the lighter-colored wood materials (i.e., maple, oak, and pine) and provided a similar level of UV stability to the underlying cherry substrate, which is darker in color.

Although the present disclosure has been described with reference to several embodiments, workers skilled in the art will recognize that changes may be made in form and detail without departing from the spirit and scope of the disclosure.

The invention claimed is:

1. A coating composition comprising:
a polymer comprising an organic backbone and at least one acetoacyl-functional group;
at least one carbonyl-functional solvent compound having a sufficient concentration in the coating composition to provide a pot life that is greater than a pot life attainable with an equal concentration of xylene, wherein a concentration of solvent-based carbonyl groups from the at least one carbonyl-functional solvent compound constitutes greater than about 15% by weight of the coating composition, based on an entire weight of the coating composition; and a crosslinking agent.

2. The coating composition of claim 1, wherein the concentration of solvent-based carbonyl groups from the at least one carbonyl-functional solvent compound constitutes greater than about 20% by weight of the coating composition, based on an entire weight of the coating composition.

3. The coating composition of claim 1, wherein the at least one carbonyl-functional solvent compound has a molecular mass less than about 200 atomic mass units.

4. The coating composition of claim 1, wherein the polymer is a first polymer having a glass transition temperature ranging from about 10° C. to about 40° C., and wherein the coating composition further comprises a second polymer comprising an organic backbone and at least one acetoacyl-functional group, and wherein the second polymer has a glass transition temperature ranging from about 60° C. to about 100° C.

5. The coating composition of claim 1, wherein the at least one carbonyl-functional solvent compound is selected from the group consisting ketones, esters, acyl halides, amides, substituted amides, carbonates, and combinations thereof.

6. The coating composition of claim 1, wherein the at least one acetoacyl-functional group is attained from at least one monomer selected from the group consisting of acetoacetoxyethyl (meth)acrylates, acetoacetoxypropyl (metha)crylates, allyl acetoacetates, acetoacetoxybutyl (meth)acrylates, 2,3-di(acetoacetoxy)propyl (meth)acrylates, t-butyl acetoacetate, diketene, derivatives thereof, and combinations thereof.

7. The coating composition of claim 1, wherein the pot life at 23° C. is at least 6 hours.

8. The coating composition of claim 1, wherein the coating composition is configured to form a coating on a wood substrate to provide a coated wood substrate, the coated wood substrate exhibiting at least three times less discoloration than the wood substrate in an uncoated state, after being exposed to UVb radiation for a 240-hour period, for a coating thickness of 0.76 millimeters.

9. A method of coating a substrate, the method comprising:
providing a coating composition comprising a polymer having an organic backbone and at least one acetoacyl-functional group, at least one crosslinking agent, and at least one carbonyl-functional solvent compound, wherein a concentration of solvent-based carbonyl groups from the at least one carbonyl-functional solvent compound constitutes greater than about 15% by weight of the coating composition, based on an entire weight of the coating composition;
applying the coating composition to a substrate;
removing at least a portion of the at least one carbonyl-functional solvent compound; and
at least partially crosslinking the polymer with the use of the at least one crosslinking agent.

10. The method of claim 9, wherein the at least one carbonyl-functional solvent compound is selected from the group consisting of ketones, esters, and combinations thereof.

11. The method of claim 9, wherein the at least one carbonyl-functional solvent compound has a molecular mass less than about 200 atomic mass units.

12. The coating composition of claim 9, wherein the polymer is a first polymer having a glass transition temperature ranging from about 10° C. to about 40° C., and wherein the formed coating composition further comprises a second polymer comprising an organic backbone and at least one acetoacyl-functional group, and wherein the second polymer has a glass transition temperature ranging from about 60° C. to about 100° C.

13. The method of claim 9, and further comprising polymerizing the polymer from monomers comprising at least one acetoacyl-functional monomer, at least one (meth)acrylate monomer, and styrene.

14. The method of claim 13, wherein polymerizing the polymer comprises:
suspending the monomers in a solvent comprising a carbonyl-functional solvent compound; and
polymerizing the suspended monomers by free radical polymerization.

15. A method for forming a coating on a wood substrate, the method comprising:
providing a solvent-borne coating composition comprising at least one crosslinking agent, an organic solvent, and a polymer having an organic backbone and a plurality of acetoacyl-functional groups, wherein the organic solvent comprises at least one carbonyl-functional solvent compound, wherein a concentration of solvent-based carbonyl groups from the at least one carbonyl-functional solvent compound constitutes greater than about 15% by weight of the solvent-borne coating composition, based on an entire weight of the solvent-borne coating composition;
applying the solvent-borne coating composition to the wood substrate;
removing at least a portion of the organic solvent; and
at least partially crosslinking the polymer with the use of the at least one crosslinking agent.

16. The method of claim 15, wherein the organic solvent m at least one carbonyl-functional solvent compound, wherein a concentration of solvent-based carbonyl groups from the at least one carbonyl-functional solvent compound constitutes greater than about 20% by weight of the solvent-borne coating composition, based on the entire weight of the solvent-borne coating composition.

17. The method of claim 15, wherein the organic solvent has a concentration in the solvent-borne coating composition that is greater than about 10% by weight.

18. The method of claim 15, wherein the solvent-borne coating composition comprises 0% by weight to less than about 40% by weight water.

19. The method of claim 15, wherein the at least one crosslinking agent comprises a polyamine, a polyetheramine, a compound containing a ketimine-functional group, a compound containing an aldimine-functional group, or a combination thereof.

20. The method of claim 15, and further comprising polymerizing the polymer from monomers comprising at least one acetoacyl-functional monomer, at least one (meth)acrylate monomer, and styrene.

* * * * *